J. Greenhalgh, Jr.
Reamer.
Nº 19,416. Patented Feb. 23, 1858.
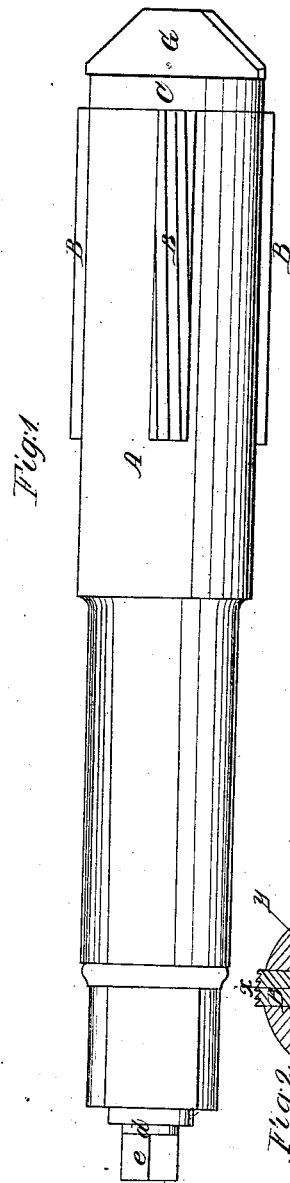
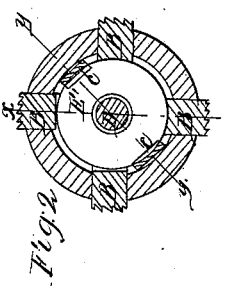
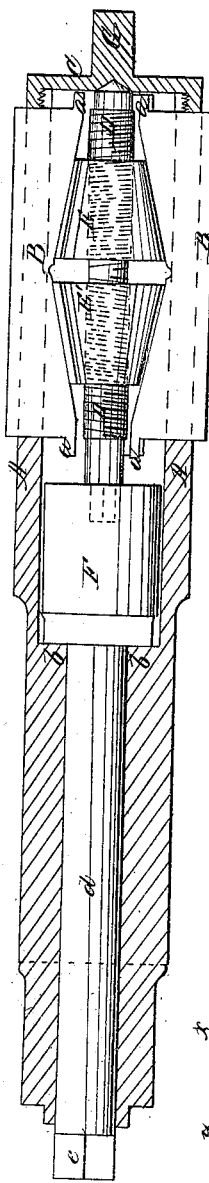
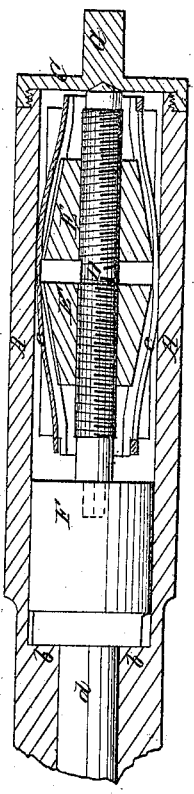
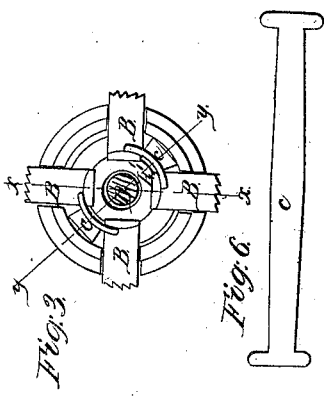
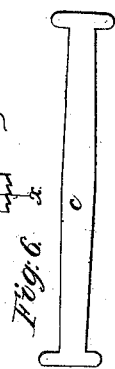

UNITED STATES PATENT OFFICE.

JAMES GREENHALGH, JR., OF BURVILLE, RHODE ISLAND.

EXPANDING-TOOL.

Specification of Letters Patent No. 19,416, dated February 23, 1858.

*To all whom it may concern:*

Be it known that I, JAMES GREENHALGH, Jr., of Burville, in the county of Providence and State of Rhode Island, have invented a new and useful Improvement Applicable to Expanding-Reamers, Screw-Taps, and other Tools; and I do hereby declare that the following is a full, clear, and exact description of the same, reference being had to the accompanying drawings, forming part of this specification, in which—

Figure 1, is an outside view of an expanding reamer constructed according to my invention. Fig. 2, is a transverse section of the same. Fig. 3, is an end view of the same without its cap, which also serves as a drill. Fig. 4, exhibits a longitudinal section of the exterior portion or stock taken in the line $(x), x$, of Figs. 2 and 3, but shows the expanding devices entire. Fig. 5, is a longitudinal section of the stock and expanding devices taken in the line $y, y$, of Figs. 2 and 3. Fig. 6, is a longitudinal view of one of the springs detached.

Similar letters of reference indicate corresponding parts in the several figures.

This invention consists in a certain mode of adjusting the cutters in expanding reamers, taps, and other tools.

To enable others to make and use my invention I will proceed to describe its construction and operation.

A, is the stock of the reamer consisting of a hollow shell of wrought iron or steel whose exterior form corresponds nearly with the form of a common reamer or screw tap having its cutting edges removed. This shell has a number of straight longitudinal slots extending from its end a suitable distance back, according to the intended length of the cutters, and the cutters B, B, are fitted to slide in these slots. The cutters are straight and have the sides which fit to the slots parallel, but have their backs tapered from each end toward the center (as shown in Fig. 4) and have a small tongue $a$, projecting from each end of their backs to prevent them being forced out from the slots. They are confined longitudinally within the slots by a cap C, which screws over the open end of the shell. The cutting edges may be constructed in the usual or any well known manner. The cap C, has a drill G formed upon it to drill the hole which is to be reamed or tapped.

D, is a screw having a right hand thread on one half its length and a left hand thread on the other half. One end of this screw D is made with a square to fit into a socket F, the stem $d$, of which passes through the head of the stock and is formed with a square $e$, outside the stock to receive a wrench or key, and the other end of the said screw is made with a cone center to work in a bearing in the cap C. The screw is confined longitudinally by the bearing in the cap C, and a shoulder $b$, in the shell against which the back of the socket F, rests. The right and left handed screw threads are fitted with two nuts E and E' one for each, having the external form of truncated cones, arranged with their bases toward each other, these nuts constitute bearings for the double tapered backs of the cutters. The cutters are confined to the cones by springs $c, c$, which bear against the interior of the shell A, and upon the tongues $a, a$, at the ends of the cutters. The nuts E, E', are prevented turning in the shell by the springs $c, c$, which enter notches in their sides as shown in Fig. 2, the springs being prevented turning by being confined between the cutters.

The adjustment of the cutters is effected by turning the screw D, by the wrench or key applied to the square $e$, on the end of the shank of the socket F, by which operation the nuts E, E', are moved longitudinally from or toward each other. When the nuts move from each other they act upon the beveled backs of the cutters to force them outward from the shell and increase the effective size of the reamer, but when they approach each other, they permit the springs to draw the cutters inward and diminish the effective size of the reamer. The reamer may be adjusted to make its edges parallel with each other or to set them with any degree of taper by a proper relative arrangement of the nuts E, E', upon the screw, and it is this provision for setting the edges parallel or tapering that constitutes the principal advantage of this arrangement for adjusting the cutters, over those arrangements in which a single cone is used to expand them. The advantage of combining the drill with a reamer or tap so as to drill a hole and ream or tap it at one operation is obvious, and making it of the same piece with the cap C, is a very simple way of applying it.

I construct screw taps in precisely the same manner as the reamer above specified excepting of course the form of the cutting edges. Expanding arbors may be made in the same way, the expanding pieces being constructed like the cutters B, B, but without cutting edges.

What I claim as my invention and desire to secure by Letters Patent, is—

The arrangement substantially as herein shown and described of the two truncated cone-shaped nuts E, E', right and left screw D, expansion pieces B, B, and springs ($c, c$) for the purposes set forth.

JAMES GREENHALGH, Jr.

Witnesses:
JAMES T. HAYFIELD,
ROBERT KERSHAW.